United States Patent
Shimoda et al.

[15] 3,650,614
[45] Mar. 21, 1972

[54] PROJECTOR

[72] Inventors: Tsunezo Shimoda; Koji Hikawa; Syuichi Yahata; Mitsugu Obata, all of Tokyo, Japan

[73] Assignee: Kabushiki Kaisha Ricoh, Tokyo, Japan

[22] Filed: Dec. 8, 1969

[21] Appl. No.: 882,958

[30] Foreign Application Priority Data

Dec. 12, 1968 Japan....................................43/108781

[52] U.S. Cl. ...................................................................353/72
[51] Int. Cl. .........................................................G03b 21/30
[58] Field of Search......................353/72, 71, 73, 78, 79, 77, 353/98, 99, 119, 122; 352/104

[56] References Cited

UNITED STATES PATENTS

| | | | |
|---|---|---|---|
| 2,361,398 | 10/1944 | Harris et al. | 353/72 |
| 3,310,360 | 3/1967 | Jarvis et al. | 352/104 |
| 2,299,657 | 10/1942 | Rystedt | 353/72 |

FOREIGN PATENTS OR APPLICATIONS

| | | | |
|---|---|---|---|
| 253,558 | 2/1961 | Australia | 353/71 |
| 1,344,255 | 10/1963 | France | 353/77 |
| 1,438,560 | 4/1966 | France | 353/77 |

*Primary Examiner*—Harry N. Haroian
*Attorney*—Burgess, Ryan and Wayne

[57] ABSTRACT

A projector having a main body with a lens therein and a cover body that encloses the main body in closed position. The cover body includes a tilted mirror on one inside end wall and a screen at the other end wall. The cover body can be moved to an open position where the end wall with the tilted mirror is in line with the lens and spaced therefrom while the other end wall is tilted upwardly to rest on the edge of the main body where the lens is mounted. A supporting means in said main body is slidable therefrom to engage an intermediate part of the cover body in the tilted open position.

4 Claims, 4 Drawing Figures

PROJECTOR

BACKGROUND OF THE INVENTION

The present invention relates to generally a projector and more particularly to a projector having a cover body which has a projection screen fixed to one end thereof.

The projector utilizing its cover as one of its projection means is known, but because of its construction, it is impossible to extend the distance between the projection lens and screen over a fixed distance.

Accordingly, one of the objects of the present invention is to provide a projector of the type in which the distance between the projection lens and screen may be extended as compared with the conventional projector.

Another object of the present invention is to provide a projector simple in construction and operation, eliminating the defects encountered in the conventional projector.

SUMMARY OF THE INVENTION

In brief, the projector in accordance with the present invention has a box-shaped cover body formed separately from the main body of the projector. The cover body has a reflecting mirror fixed to the inner surface of one end wall thereof and a screen held in position instead of the other end wall of the cover body in opposed relation with the reflecting mirror. When the lower side edge of the screen is made to bear upon the upper side edge of the main body above the projection lens, the reflecting mirror is so located as to oppose both of the screen and the projection lens for projection.

According to one embodiment of the present invention, the reflecting mirror is so angularly positioned as to permit the best observation of the projected images through the screen when the lower side edge of the end wall of the cover body having the reflecting mirror fixed to the inner surface thereof is made to bear upon the same surface as that upon which holds in position the projector main body whereas the lower side edge of the screen is made to bear upon the upper side edge of the main body above the projection screen thereof.

According to another embodiment of the present invention, the cover body is supported by a pair of supporting members which in turn are slidably fixed to the inner surfaces of both of the side walls of the projector main body.

According to the present invention, the cover body of the projector is utilized as a screen holding member so that the projection can be made, without providing a large-sized screen, for a very small group of observers, pre-views, etc. Furthermore, the projector of the present invention can be used even in the outdoors where it is difficult to provide or install the screen. As described above the projector utilizing its cover as one of the means of projection is known, but according to the present invention, the reflecting mirror can be best utilized because the cover body is positioned in projection position slantingly of the projection main body. Since the projected images are viewed through the screen, the mirror image of the objects to be projected will not be seen even though the reflecting mirror is used in the projection optical system.

The above and other objects, features and advantages of the present invention will become more apparent from one illustrative embodiment thereof with reference to the accompanying drawings.

DESCRIPTION OF THE PREFERRED EMBODIMENT

Figure 1:
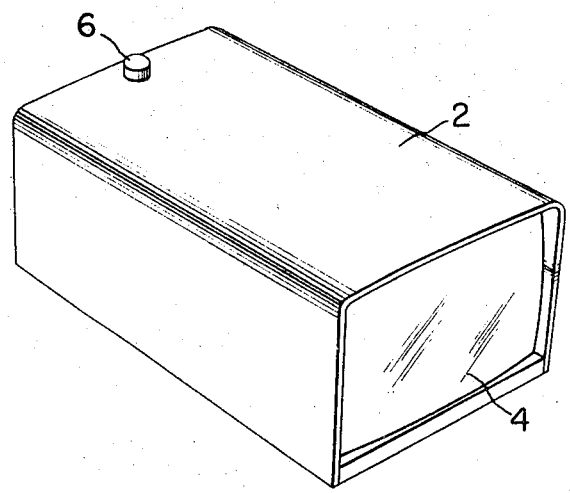
FIG. 1 is a perspective view of one embodiment of a cover body for a projector according to the present invention.
Figure 2:
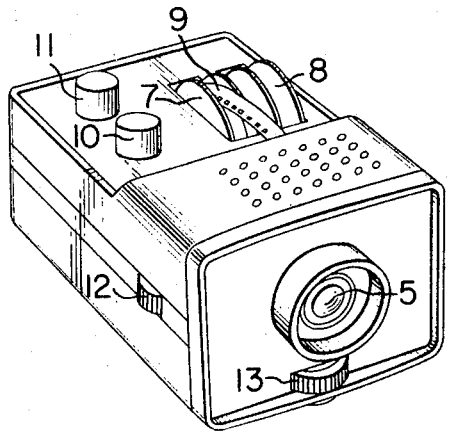
FIG. 2 is a perspective view of a main body of the projector.

A cover body 2 of a projector in accordance with the present invention is of box shape as shown in FIG. 1 and has a self-contained screen 4 and a cover locking button 6. A projector main body 1 has, as shown in FIG. 2 a projection lens 5, a film supply reel 7, a film takeup reel 8, a film 9, a focusing knob 10, a film advance speed control knob 11, a projection lens magnifying power adjustment knob 12 and a height adjustment knob 13. The projector main body 1 as shown in FIG. 2 can project the images of the film upon a screen hung upon a wall in a well known manner.

Figure 3:
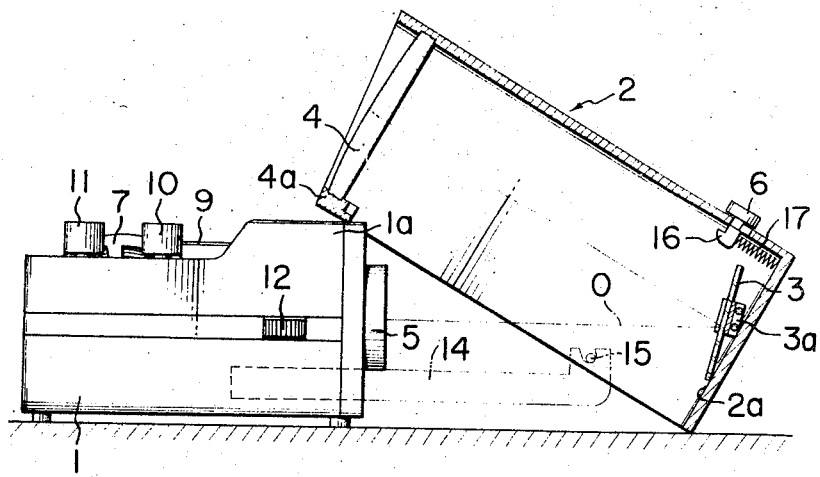
FIG. 3 is a side view partly in section when the projector of the present invention is set for projection.

The cover body 2 has, as shown in FIG. 3, a reflecting mirror 3 fixed to one end wall 2a by use of a support 3a so that the reflecting surface of the mirror 3 is directed inwardly. It is noted that the reflecting mirror 3 is so angularly positioned that when the lower frame 4a of the screen 4 of the cover body 2 is made to bear upon the portion above the projection lens 5 of the main body 1, the light ray along the optical axis of the projection lens 5 may be precisely reflected toward the center of the screen 4. In the instant embodiment shown in FIG. 3, the lower side edge of the end wall 2a is located upon the same surface as that upon which the main body 1 is held in position, but it is noted that as shown in FIG. 3, a supporting member 14 is arranged for slidable movement away and into each of the side surfaces of the main body and is provided with a recess at the free end of the supporting member for engagement with a pin 15 extending from the side wall of the cover body 2 when the supporting member 14 is fully extended away from the main body 1, thereby holding the reflecting mirror 3 in said angular position. The inner surface of the screen 4 is a frosted surface while the outer surface is in the form of a slightly convex lens surface. The screen 4 is made of a suitable transparent material such as transparent glass synthetic resin and the like and has any form depending upon the purpose.

Figure 4:
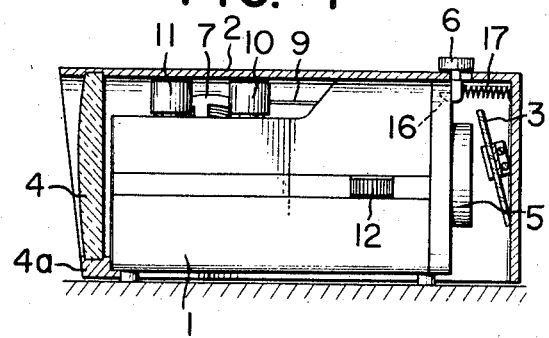
FIG. 4 is a side view partly in section when the cover body is fitted over the main body of the projector for storage, etc.

When the projector main body 1 is stored, the cover body 2 is fitted thereover as shown in FIG. 4. In this case, the lower frame 4a of the screen 4 is engagement with the rear lower side edge of the main body 1. An engaging member 16 attached to lock button 6 is slidably fixed to the upper wall of the cover body 2 at the front portion thereof for engagement with the forward, upper side edge of the main body 1 and is normally biased by a spring 17 so as to move to the left in FIG. 4. Therefore, when the cover body 2 is fitted over the main body 1, the former is readily held in position relative to the latter. When it is desired to remove the cover body 2 from the main body 1, the slidable engaging member 16 may be displaced toward the right in FIG. 4 by operating the lock button 6 for releasing the engagement of the member 16 with the upper side edge of the main body 1. Any other suitable detachably locking method may be employed.

We claim:
1. A projector comprising a main body including a lens and a cover body fittable over said main body
    said main body having a front wall and a rear wall with said lens mounted on said front wall, said main body further having a lower wall located in a plane to be positionable on a flat surface;
    said cover body having a front wall and a rear wall, said rear wall formed by a frame having a screen mounted therein, and said front wall having a tilted mirror mounted thereon;
    said cover body positionable in a closed position to completely enclose said main body with said screen located closely adjacent said main body rear wall and said cover body front wall located closely adjacent said main body front wall;
    said cover body positionable in an open position wherein said cover body front wall is remotely located from said main body front wall with a lower edge of said cover body front wall located substantially in said plane to be positionable on the flat surface;

said cover body being tilted to said open position wherein a lower edge of said frame rests on an upper edge of said main body front wall, said tilted position allowing light passing through said lens to be reflected from said tilted mirror and through said screen; and supporting means slidably mounted within said main body, said supporting means completely positioned within said main body when said cover body is in the closed position, and said supporting means being extendible from said main body to engage an intermediate area on said cover body when said cover body is in the open position.

2. A projector according to claim 1 in which said supporting means comprises an elongated member having an engaging recess on the end that extends from said main body, said cover body has a pin mounted at said intermediate area, and said engaging recess engages said pin when said elongated member is extended.

3. A projector according to claim 1 in which locking means is mounted on an upper wall of said cover body adjacent said cover body front wall, said frame has a lower engaging edge, and in the closed position of said cover body said engaging edge engages a lower edge of said main body rear wall and said locking means engages a top area of said main body front wall.

4. A projector according to claim 3 in which said locking means is spring biased into engaged position and includes a button element projecting through a top wall of said cover body, said button element being selectively actuable to release said spring bias and locking engagement of said locking means.

* * * * *